United States Patent [19]

Kimak

[11] Patent Number: 4,990,044
[45] Date of Patent: Feb. 5, 1991

[54] THREADED PUSH-ON FASTENER

[76] Inventor: Daniel Kimak, 16460 Hosmer Rd., Middlefield, Ohio 44062

[21] Appl. No.: 749,124

[22] Filed: Jun. 26, 1985

Related U.S. Application Data

[63] Continuation of Ser. No. 359,784, Mar. 19, 1982, abandoned.

[51] Int. Cl.$^5$ .............................................. F16B 37/00
[52] U.S. Cl. ..................................... 411/427; 411/301; 411/371; 411/435; 411/437
[58] Field of Search ................ 411/427, 429, 437, 436, 411/511, 280, 301, 324, 435, 432, 433, 371, 373, 377; 24/651

[56] References Cited

U.S. PATENT DOCUMENTS

| D. 157,484 | 2/1950 | Gade . | |
|---|---|---|---|
| 2,335,769 | 11/1940 | Kissling | 411/435 X |
| 2,337,995 | 12/1943 | Harper | 24/217 |
| 2,347,863 | 5/1944 | Woodward | 24/216 |
| 2,378,957 | 6/1945 | Tinnerman | 411/437 |
| 2,381,111 | 8/1945 | Chandler | 411/280 |
| 2,401,672 | 6/1946 | Tinnerman | 411/437 |
| 4,299,520 | 11/1981 | Iwata | 411/437 |

FOREIGN PATENT DOCUMENTS

| 1061613 | 9/1979 | Canada | 411/433 |
|---|---|---|---|
| 1965107 | 7/1971 | Fed. Rep. of Germany | 411/437 |
| 2422094 | 11/1975 | Fed. Rep. of Germany | 411/280 |
| 1018391 | 10/1952 | France | 411/280 |
| 1180317 | 12/1958 | France | 411/280 |
| 260727 | of 1926 | United Kingdom | 411/280 |
| 478782 | 1/1938 | United Kingdom | 411/427 |
| 511265 | 8/1939 | United Kingdom | 411/280 |
| 550944 | 2/1943 | United Kingdom | 411/435 |

OTHER PUBLICATIONS

M. Henry, "Push-On Nut", IBM Technical Disclosure Bulletin, vol. 20, No. 3, Aug. 1977.

Primary Examiner—Rodney M. Lindsey
Attorney, Agent, or Firm—Watts, Hoffmann, Fisher & Heinke

[57] ABSTRACT

A push on fastener 10, 48, 70, 78 comprised of a supporting base 12, 54, 80, a body with threaded nut portions 20, 58, 86 and a split annular web 16, 56, which extends inwardly from one side of the supporting base to the threaded nut portions. The split annular web enables the fastener to be firmly tightened and eliminates the possibility of back slippage.

5 Claims, 2 Drawing Sheets

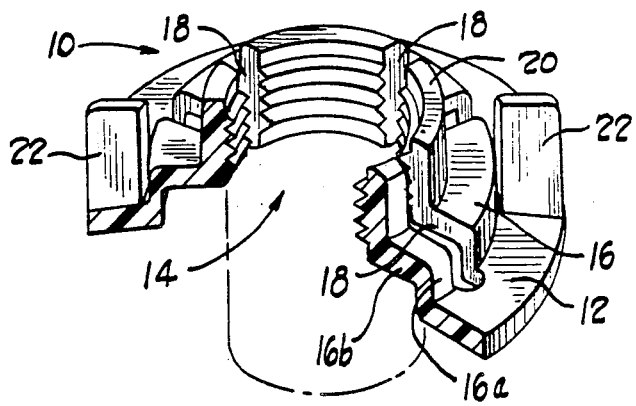
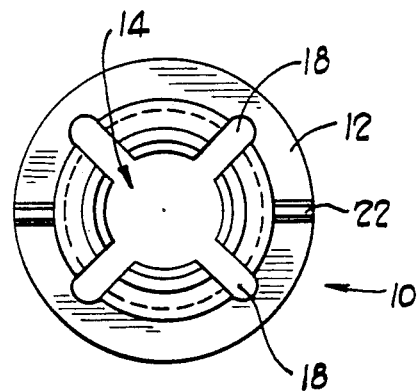
Fig. 1
Fig. 3
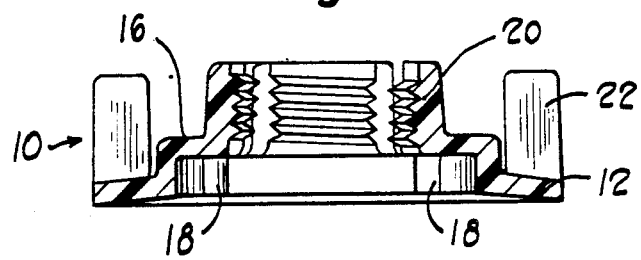
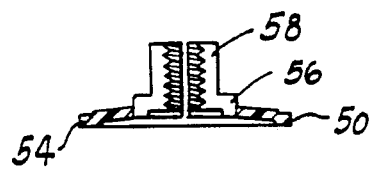
Fig. 2
Fig. 6
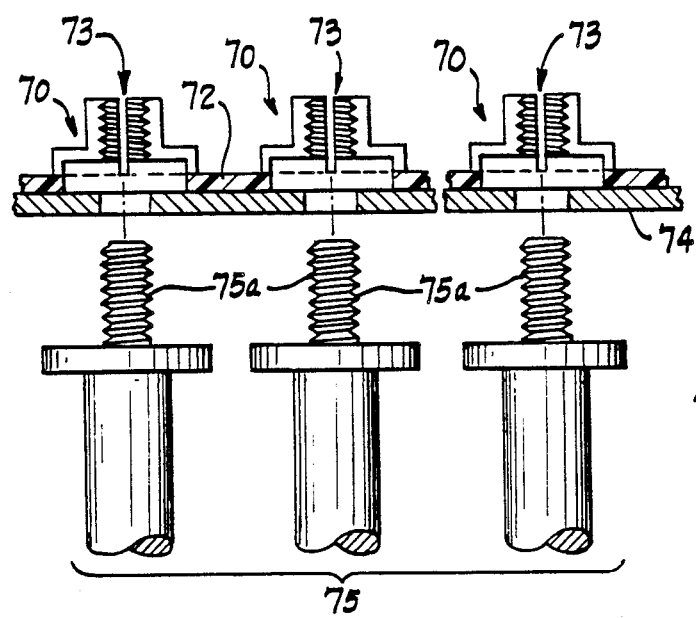
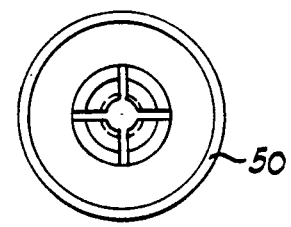
Fig. 7
Fig. 9
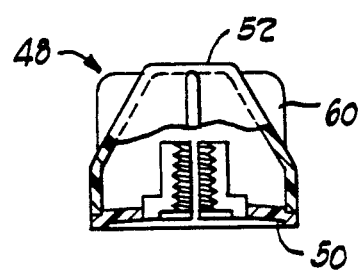
Fig. 8

THREADED PUSH-ON FASTENER

This application is a continuation of application Ser. No. 359,784, filed March 19, 1982, now abandoned.

DESCRIPTION

1. Technical Field

The present invention relates to push-on threaded fasteners.

2. Background Art

Push-on fasteners in which threaded body portions have deflectable sides that enable the fastener to be pushed over a threaded member and then rotated to tighten, are known. They have, however, been deficient in providing both ease of assembly and sufficient gripping force when tightened by rotation.

3. Disclosure of the Invention

The present invention provides a fastener with an expandable threaded body portion that enables the fastener to easily receive or be pushed over a threaded male member and yet be firmly secured in place after final tightening. In preferred embodiments, the fastener is comprised of a base, such as an annular flange, a split annular web displaced axially from the base and extending radially inward of a circumferentially continuous base portion, and one or more internally threaded arcuate nut portions, separated at the split or splits in the web, and extending axially from the web in a cylindrical path and in a direction axially away from the base. In the preferred embodiments there are an equal number of threaded portions as there are splits in the annular web.

Where the fastener is a nut, adapted to be pushed onto a threaded member and tightened by rotation, wings or other surface conformations for transmitting rotation to the fastener are associated with the base or web, or both, remote and independent from the arcuate nut portions. The base or flange serves not only as a washer and bearing surface for the fastener, but also provides a surface through which fi push and then a rotational force can be applied to install the fastener. The web construction supports the arcuate nut portion or portions in a cantilevered fashion from the base and allows the nut portion to deflect radially outwardly and axially away from the base during initial installation when the fastener is pushed over a threaded member, and to then deflect radially inwardly and axially toward the base when the fastener is rotated to tighten the base of the fastener against an article. This construction insures a secure fit and eliminates the possibility of the fastener slipping backward under axial force. In a preferred embodiment, there are four arcuate nut portions cantilevered by webs from the base.

The above and other features and advantages of the invention will become better understood from the detailed description that follows, when considered in connection with the accompanying drawings.

BRIEF DESCRIPTION OF THE DRAWINGS

FIG. 1 is a perspective view in part cut away of a fastener embodying the present invention.

FIG. 2 is a cross sectional side view of the fastener of FIG. 1.

FIG. 3 is a top plan view of the fastener shown in FIG. 1.

FIG. 6 is a cross sectional side view of the base portion of a covered fastener embodying the invention.

FIG. 7 is a top plan view of the base portion of FIG. 6.

FIG. 8 is a view partly in section and partly in side elevation of the fastener of FIGS. 6 and 7.

FIG. 9 is a cross sectional side view of a molded plate having several integral fasteners arranged to receive threaded studs.

BEST MODE FOR CARRYING OUT THE INVENTION

Figure 10:
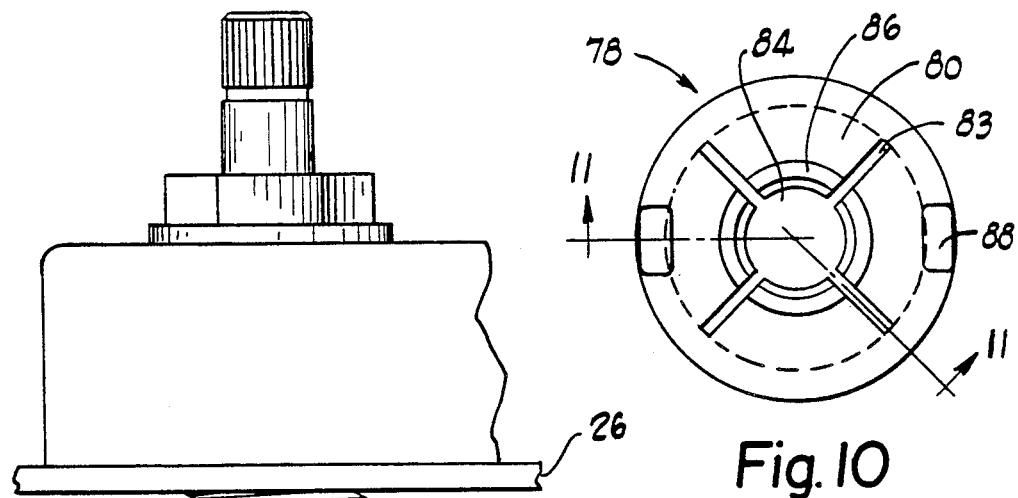
FIG. 10 is a top plan view of another embodiment of the invention.

The present invention utilizes a threaded female member with an internally threaded nut portion peripherally split in an axial direction to facilitate radial expansion. The threaded nut portion is supported from a base, such as a washer-like flange, by a flexible web portion that extends radially between the base and nut portion and that is also split to facilitate radial expansion and longitudinal movement of the nut portion relative to the base, and also to act as a spring to bias the nut portion against a surrounded externally threaded member and to load the members axially and thereby resist loosening.

Referring now to FIGS. 1, 2, and 3, a push-on fastener 10 embodying the invention is shown. The fastener includes a base 12 which acts as a washer. In the preferred embodiment the base is circular and contains a circular central opening 14 through which a threaded member extends. The base serves to bear against a flat surface of a structure to which the fastener secures a threaded member.

A stepped flexible web 16, radially split at one or more locations, extends from the inner circumference of the base. The web has two angularly related surfaces, the first 16a extends axially and the second 16b extends radially inward. The web is of lesser cross section than the base or the nut portions. In the preferred embodiment there are four splits 18 that extend slightly into the flange-like base 12 to provide maximum flexibility and hence ease of applying the fastener to a threaded member. This is especially desirable when the fastener is to be applied to a metal threaded member that has sharp threads. In addition, in the preferred embodiment, the flange-like base 12 is slightly conical as shown in FIG. 2, by about 5° from a flat plane, which also helps facilitate push-on. Internally threaded arcuate nut portions 20 extend axially from the web and away from the flange. There are the same number of nut portions as there are splits in the flexible web. Each threaded nut portion extends from a section of the flexible web positioned between two splits. The threaded nut portions engage an externally threaded member upon assembly. Torque transmitting surfaces 22 are located on the flange. These surfaces facilitate final tightening of the fastener by rotation. In the preferred embodiment these surfaces are wings to facilitate hand-tightening.

Figures 4, 11:
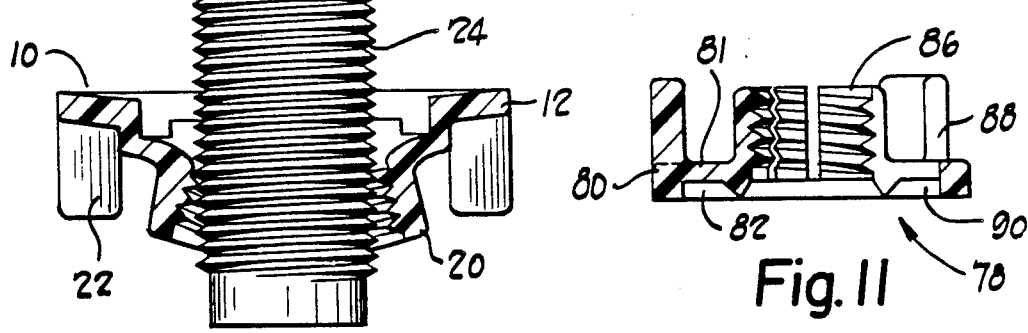
FIG. 4 is a view partially in cross section and partially in elevation showing the fastener of FIG. 1 being pushed over a threaded member.
FIG. 11 is a sectional view of FIG. 10 taken along the line 11—11.
Figure 5:
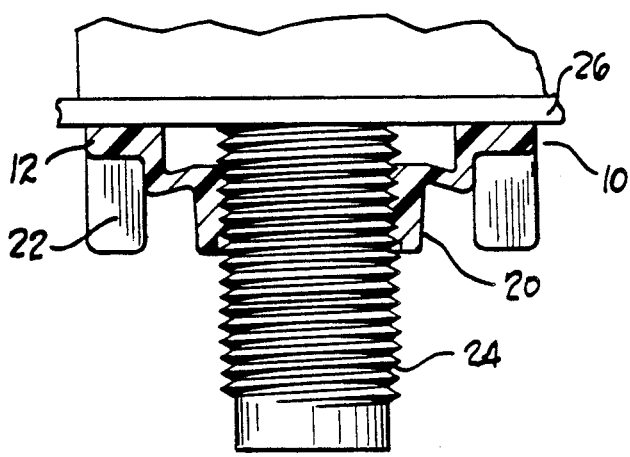
FIG. 5 is a view similar to FIG. 4 showing the fastener of FIG. 1 upon final tightening.

Referring now to FIGS. 4 and 5, the fastener 10 is pushed over the threads of an externally threaded member 24, such as a pipe, until the base 12 is in contact with a back plate 26. The threaded nut portions 20 are cammed outward by the external pipe threads as the fastener is pushed on. The resiliency of the flexible web permits the threaded nut portions to move radially outward over the threads of the threaded member.

The fastener is then tightened by hand rotation of the torque transmitting surfaces 22. Upon final tightening the web portion becomes distorted toward the flange portion as shown in FIG. 5 and biases the threaded nut portions into contact with the threaded member. Also, the conical configuration of the base or flange 12 flattens, applying additional force that biases the nut portions inwardly. Thus, axial slippage through radial expansion in response to axial load is prevented. Also, the resiliency of the web, as well as the slightly conical flange of the preferred embodiment, loads the nut axially, performing the function of a lock washer to inhibit loosening from vibration.

Referring now to FIGS. 6, 7 and 8 another embodiment of the invention is shown in which a fastener with a split nut portion is covered to prevent leakage of fluid through the fastener. The covered fastener 48 is comprised of two parts, a fastener portion 50 and a cover 52. The fastener portion 50, shown in FIGS. 6 and 7, consists of a base 54, a flexible web 56 and threaded nut portions 58. In this embodiment the base portion is slightly conical, and angled approximately 5° toward the flexible web. This incline enables the fastener to be easily slipped over a threaded member and prevents slippage backward. As shown in FIG. 8, the cover 52 is frusto-conical in shape and is attached to the periphery of the base 54. Torque transmitting surfaces 60 are formed on the cover and facilitate final tightening through rotation The cover encloses the nut portions and base, preventing entry of water, e.g., when exposed to the weather in use. The fastener portion and cover can be spin welded together or attached in any other suitable manner, as with an adhesive.

Referring now to FIG. 9, another embodiment of the invention is illustrated in which a plurality of push-on fastener portions 70 are incorporated into a single base or support member 72. The support member is positioned in use with the threaded fasteners 70 aligned with holes 73 in a part 74 to which members, such as threaded studs 75, are to be secured. Threaded portions 75a of the members or studs 75 are pushed through the part 74 and into the respective fastener portions 70 and tightened by rotation.

Figure 12:
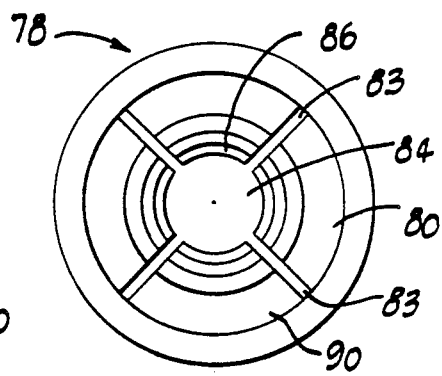
FIG. 12 is a bottom plan view of the fastener shown in FIG. 10.

Referring now to FIGS. 10, 11 and 12, another embodiment of the invention is shown. The embodiment illustrated in these figures is a fastener suitable for situations where there is only a limited amount of clearance, e.g., for securing toilet seats to bowls.

The fastener 78 illustrated in FIGS. 10, 11 and 12 includes a ring 80 having a planar surface 81 on one side, as shown in FIGS. 10 and 11, and a grooved surface 82 on the opposite side, as shown in FIG. 12. The ring forms the base and the grooved surface 82 seats against a surface through which a threaded fastener such as a bolt extends. The ring 80 contains four splits 83 extending from a central opening 84 to the outer perimeter of the ring. Threaded arcuate nut portions 86 extend axially from the ring 80. There are the same number of nut portions as there are splits in the ring. In the preferred embodiment there are four arcuate nut portions and four splits. Torque transmitting surfaces 88 extend axially from the planar surface of the ring 81 as shown in FIGS. 10 and 11.

The grooved surface of the ring 82 has an undercut portion 90 of lesser cross section than either the outer or inner perimeters of the ring 80. The undercut portion 90 imparts flexibility to the ring and enables the nut portions to be pushed over a threaded member without breakage.

In the preferred embodiments the fastener is constructed of polyethylene. Other materials which would impart similar flexibility and strength to the fastener are suitable.

While certain embodiments have been disclosed in detail, various modifications or alterations may be made herein without departing from the spirit or scope of the invention set forth in the appended claims.

I claim:

1. A push on threaded female fastener comprising a base with a face constructed to bear against an abutting surface, an opening of a first diameter through the base, a split annular flexible and resilient web means surrounding the opening and having a first portion attached to the base and extending from the base in the direction of a central axis of the opening and a second portion extending from the first portion radially inward toward and at a right angle to the central axis in a plane parallel to the general extent of said base face, and arcuate internally threaded nut portions attached to and of substantially greater axial length than the second portion of the web means, extending axially away from the base and forming a passage axially aligned with the opening through the base and of a second diameter sensibly smaller than said first diameter, there being a number of arcuate nut portions equal to the number of splits in the annular web means, and said annular split web means being thinner in cross section than either the base or said nut portions and flexible enough to allow through distortion the nut portions to more axially of the fastener in opposite directions from an undistorted condition in which the second portion of the web means is at a right angle to the central axis, in response to axially applied forces to the nut portions.

2. A fastener as set forth in claim 1 wherein said face of the base is frusto-conical in shape and the base is sufficiently flexible and resilient that the face flattens when the fastener is tightened against said abutting surface.

3. A fastener as set forth in claim 1 wherein the base includes surfaces extending in an axial direction to facilitate imparting rotation to the fastener about the axis.

4. A fastener as set forth in claim 1 including a cover integral with the base and having a cavity that receives and is spaced peripherally from the nut portions and with a peripheral edge connected to the base radially outward from the annular web.

5. A push on threaded female fastener comprising a base with a face constructed to bear against an abutting surface, a plurality of openings of first diameters through the base, a split annular flexible and resilient web surrounding each opening and having a first portion attached to the base and extending from the base in the direction of a central axis of the opening and away from said face and a second portion extending from the first portion radially inwardly of the opening, toward and at a right angle to the central axis in a plane parallel to the general extent of said base face and arcuate internally threaded nut portions attached to and of substantially greater axial length than the second portion of the web surrounding each opening, extending away from the base and forming an opening axially aligned with the surrounded opening through the base and of a second diameter sensibly smaller than the said first diameter of the surrounded opening, there being a number of arcuate nut portions on each annular split web equal to the number of splits in the web, and said web being thinner in cross section than either the base or said nut portions and flexible enough to allow through distortion the nut portions to move axially of the fastener in opposite directions from an undistorted condition in which the second portion of web is at a right angle to the central axis, in response to axially applied forces to the nut portions.

* * * * *

UNITED STATES PATENT AND TRADEMARK OFFICE
CERTIFICATE OF CORRECTION

PATENT NO. : 4,990,044

DATED : February 5, 1991

INVENTOR(S) : Daniel Kimak

It is certified that error appears in the above-identified patent and that said Letters Patent is hereby corrected as shown below:

Title page, Inventor, delete "Daniek Kimak, 16460 Hosmer Rd., Middlefield, Ohio 44062" and insert --Daniel Kimak, deceased late of Middlefield, Ohio; by Emogene G. Kimak, legal representative, 16460 Hosmer Rd., Middlefield, Ohio 44062--.

Column 1, line 40, delete "fi push" and insert -- first a pushing--.

Signed and Sealed this

Second Day of March, 1993

Attest:

STEPHEN G. KUNIN

Attesting Officer

Acting Commissioner of Patents and Trademarks